United States Patent [19]
Miyake

[11] Patent Number: 5,987,321
[45] Date of Patent: Nov. 16, 1999

[54] RADIO DATA COMMUNICATION SYSTEM USING A PLURALITY OF RADIO COMMUNICATION SYSTEMS

[75] Inventor: Masayasu Miyake, Fuchu, Japan

[73] Assignee: Casio Computer Co., Ltd., Tokyo, Japan

[21] Appl. No.: 08/619,281

[22] Filed: Mar. 18, 1996

[30] Foreign Application Priority Data

Mar. 20, 1995 [JP] Japan ................................. 7-087428

[51] Int. Cl.$^6$ .............................. H04B 1/00; H04B 7/00
[52] U.S. Cl. ..................... 455/426; 455/415; 455/448
[58] Field of Search ..................... 370/445, 455,
370/432, 435, 401, 338; 455/525, 54.1,
7, 11.1, 31.2, 31.3, 557, 180.2, 228, 426,
562, 561, 434, 432, 435, 415, 448

[56] References Cited

U.S. PATENT DOCUMENTS

| | | | |
|---|---|---|---|
| 5,065,423 | 11/1991 | Gaskill | 379/57 |
| 5,077,732 | 12/1991 | Fischer et al. | 370/85.4 |
| 5,122,795 | 6/1992 | Cubley et al. | 340/825.44 |
| 5,123,029 | 6/1992 | Bantz et al. | 375/1 |
| 5,159,592 | 10/1992 | Perkins | 370/85.7 |
| 5,212,806 | 5/1993 | Natarajan | 455/33.2 |
| 5,297,143 | 3/1994 | Fridrich et al. | 370/85.3 |
| 5,410,732 | 4/1995 | Ames et al. | 455/33.1 |
| 5,519,706 | 5/1996 | Bantz et al. | 370/85.3 |
| 5,845,202 | 12/1998 | Davis | 455/412 |

FOREIGN PATENT DOCUMENTS

WO 93/07691  4/1993  WIPO .
WO 94/15431  7/1994  WIPO .

*Primary Examiner*—Douglas W. Olms
*Assistant Examiner*—David R Vincent
*Attorney, Agent, or Firm*—Frishauf, Holtz, Goodman, Langer & Chick, P. C.

[57] ABSTRACT

When data (for example, an electronic mail) is input to a semi-fixed terminal connected to a network, the terminal creates a transmission message on the basis of information on the position of a corresponding mobile terminal stored in the semi-fixed terminal and sends this message to the network, which sends data at once to the mobile terminal through a predetermined gateway station and base station on the basis of the information on the position of the message.

17 Claims, 11 Drawing Sheets

FIG.4A

MESSAGE A: 311 PREAMBLE | 312 HRPC NO. | 313 PC NO. | 314 DATA | 315 POSTAMBLE

FIG.4B

MESSAGE B: 321 PREAMBLE | 322 PC NO. | 323 HRPC NO. | 324 BS NO. | 325 GW NO. | 326 DATA | 327 POSTAMBLE

FIG.4C

MESSAGE C: 331 CALL | 332 PC NO. | 333 NETWORK CONNECTION REQUEST | 334 GW NO. | 335 BS NO. | 336 HRPC NO. | 337 DATA | 338 END SIGNAL

FIG.4D

MESSAGE D: 341 CALL | 342 GW NO. | 343 GW CONNECTION REQUEST | 344 PC NO. | 345 BS NO. | 346 HRPC NO. | 347 DATA | 348 END SIGNAL

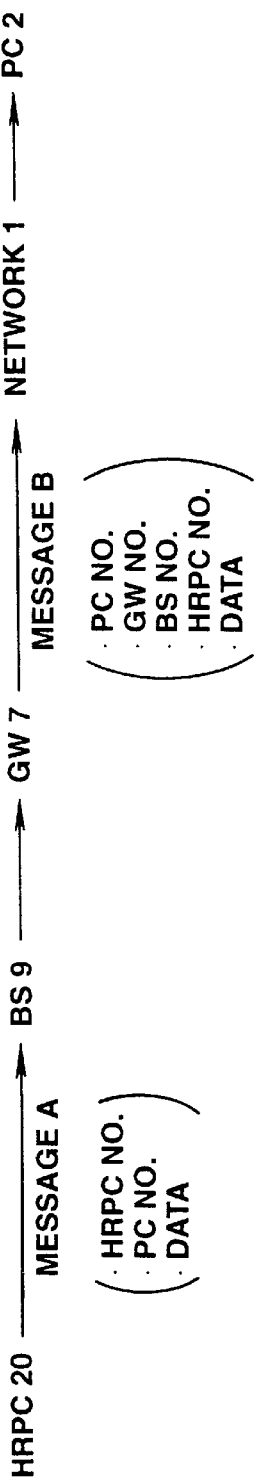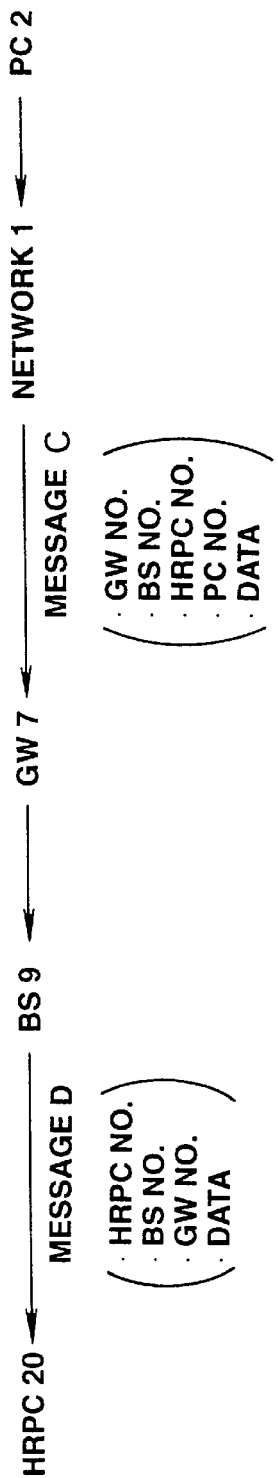
FIG.5A
FIG.5B

RADIO DATA COMMUNICATION SYSTEM USING A PLURALITY OF RADIO COMMUNICATION SYSTEMS

BACKGROUND OF THE INVENTION

1. Field of the Invention

The present invention relates to radio data communication systems which transmit data from a semi-fixed terminal to a mobile terminal.

2. Background Art

Recently, personal computers have remarkably spread and the functions of portable personal computers have improved. Articles usable instead of regular personal computers have been developed and are easily available commercially. The portable personal computers are small-sized and lightweight and are convenient to take outdoors to go out, for example, on a business trip, but its memory capacity and display screen are small, so that a large amount of data can not be stored and displayed. As a result, as the case may be, necessary data is required to be downloaded from a stand-alone personal computer in the office and to use it, as required.

Recently, electronic mail using a personal computer has been used successfully. Generally, even when the user of the electronic mail is away from his office, for example, on a business trip, he needs access to his electronic mail very frequently. In such a case, transfer of an electronic mail received by a stand-alone personal computer to his portable personal computer improves productivity. However, at present, there are no methods of transferring data such as an electronic mail automatically from the stand-alone personal computer to a portable personal computer.

As described above, in the conventional bidirectional radio data communication system, the portable personal computer is completely independent of the stand-alone personal computer. There are no functions of receiving data such as an electronic mail between the stand-alone type personal computer and a portable personal computer at a remote place, so that a complicated manipulation by the user is required each time the communication is required. Mistakes in the manipulation are likely to occur and the manipulation is time consuming.

SUMMARY OF THE INVENTION

It is therefore an object of the present invention to provide a radio data communication system in which data transmission is performed easily and securely for the users between a mobile terminal and a fixed terminal or between mobile terminals.

In order to achieve the above object, according to the present invention, there is provided a radio communication system which includes a personal computer connected in a semi-fixed manner to an existing network and a radio terminal connected through a relay to the network and corresponding to the personal computer to thereby provide communication between the personal computer and the radio terminal, wherein the personal computer calls the radio terminal on the basis of external data input thereto;

the radio terminal sends a responsive signal through the relay to the personal computer on the basis of the call from the personal computer;

the relay sends the network the responsive signal and information on the position of the relay added to the responsive signal;

the personal computer sends the network data with the information on the position of the relay added to the responsive signal from the network; and the relay sends data to the radio terminal on the basis of the information on the position of the relay attached to the data received from the network.

BRIEF DESCRIPTION OF THE DRAWINGS

FIGS. 4A to 4D show the structures of a transmission signal used in a bidirectional radio data communication system according to the present invention;

FIGS. 5A and 5B show flows of a transmission signal used in the bidirectional radio data communication system;

DESCRIPTION OF THE PREFERRED EMBODIMENTS

An embodiment of the present invention will be described next with reference to the accompanying drawings. It is to be noted that the composition of a communication system which will be described below is common to cases 1–6 to be described later.

Figure 1:
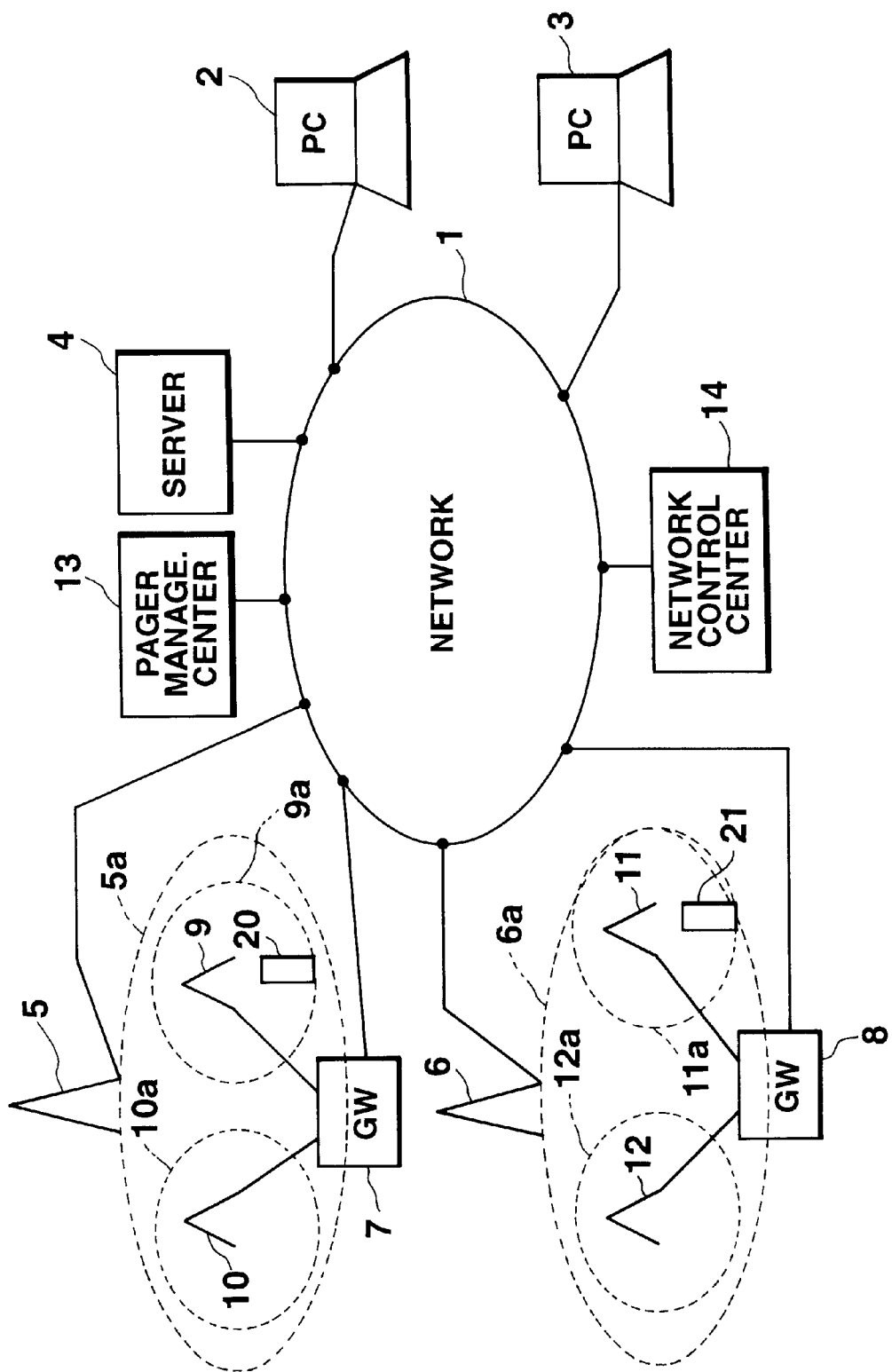
FIG. 1 shows the composition of a whole system according to the present invention.

A. Structure of Communication System:

FIG. 1 is a block diagram indicative of a communication system of the present invention. In FIG. 1, reference numeral 1 denotes a network such as a general public network or a private network as an alternative to the former. The network 1 is connected through a modem (not shown) to semi-fixed personal computers 2, 3 (hereinafter referred to as "PC" simply) installed permanently or semi-permanently in an office.

PCs 2,3 each function as a host computer for portable personal computers 20, 21. The portable personal computers 20, 21 are hand-held, radio communication, personal computers, each having a radio communication function (each hereinafter referred to as a "HRPC" simply). The HRPCs 20, 21 are to be described later.

A server 4 of an information/service company is connected through a modem (not shown) to the network 1. By accessing the server 4, predetermined information or predetermined service is available.

In addition, provided in the network 1 is a unidirectional radio communication system which is managed by a management center 13 connected to the network 1. Data can be transmitted through unidirectional radio communication base stations 5, 6 connected to the network 1 to HRPCs 20, 21 (hand-held radio communication personal computer) in predetermined service areas 5a, 6a which the unidirectional radio communication base stations 5, 6 cover. As the unidirectional radio communication system, a paging system, for example, can be considered, but it is not limited to same. The unidirectional radio communication system will be described below as an example. The management center will be described as a pager management center 13 while the unidirectional radio communication base stations will be described as pager base stations 5, 6.

Provided in the network 1 is a bidirectional radio communication system, which includes bidirectional radio communication gateway stations (hereinafter each referred to as GW) 7, 8 connected to the network 1, and bidirectional radio communication base stations 9, 10; 11, 12 connected to the GWs 7, 8, respectively. Data can be transmitted/received through the bidirectional radio communication base stations 9, 10; 11, 12 to/from HRPCs 20, 21 in predetermined service areas 9a, 10a; 11a, 12a which the base stations 9, 10; 11, 12 cover. In the network 1, a network control center 14 manages the connection of the network, a fee, etc. The combination of a GW (7 or 8) and its associated base stations (9, 10 or 11, 12, respectively) comprise a "relay" which is referred to in the claims.

The HRPCs 20, 21 are carried by the user and software provided in the HRPCs 20, 21 provides the functions of a schedule notebook, telephone book, memorandum book, word processor, etc. In addition, HRPCs 20, 21 each have a pager reception function for receiving data incoming through a pager base station and a bidirectional radio communication function which transmits/receives data through a bidirectional radio communication base station.

Figure 2:
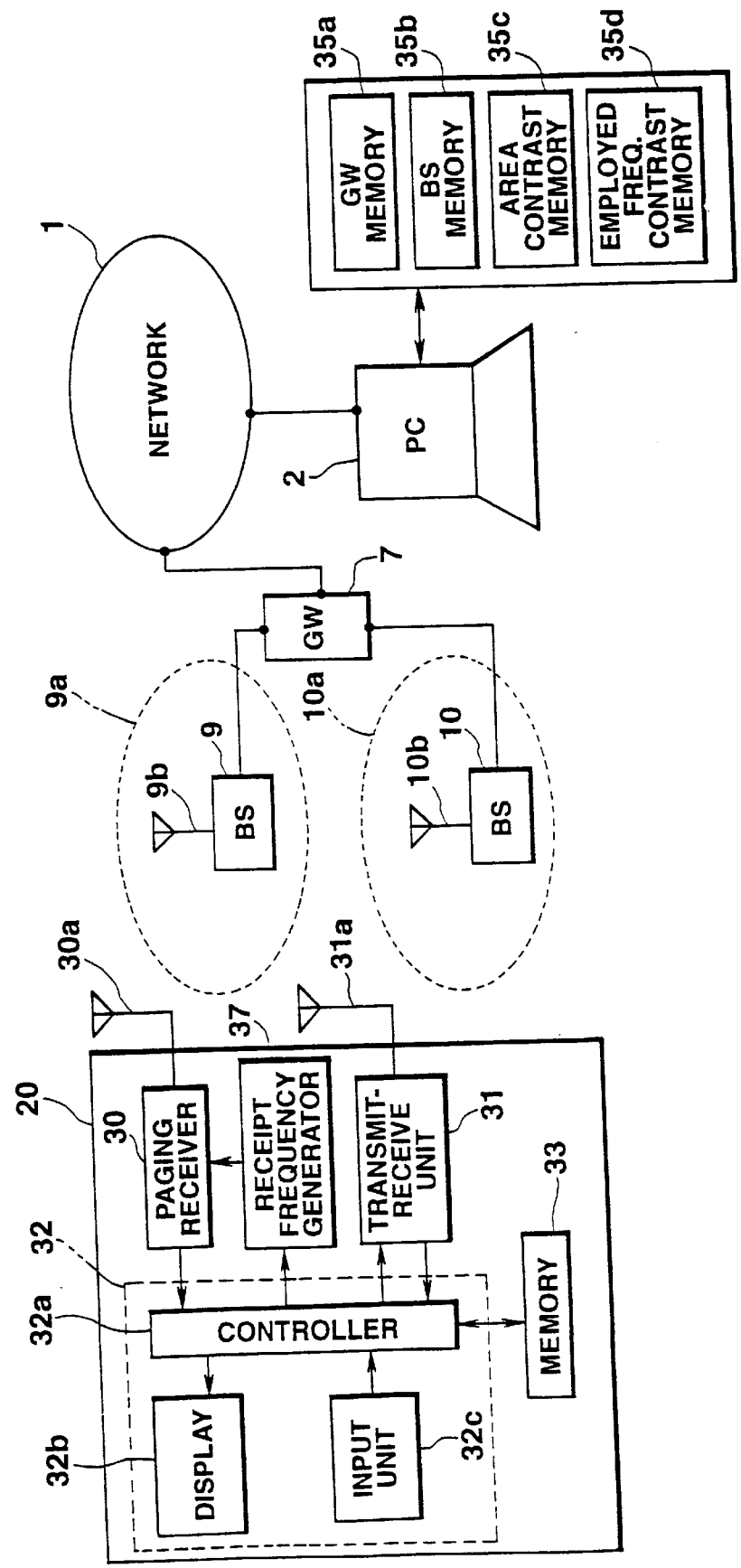
FIG. 2 shows the composition of essential portions of the system.

The details of the bidirectional radio communication system will now be described. FIG. 2 shows a specified structure of a part of the bidirectional radio communication system. The same reference numerals are used to denote the same elements in FIGS. 2 and 1, and further description thereof will be omitted.

In FIG. 2, GW 7, which controls the connection with the network 1 and controls the bidirectional radio communication base stations 9, 10, is connected to the network 1. GW 7 is allocated a unique identification number (hereinafter referred to as a GW number). The base stations 9, 10 connected to the GW 7 have antennas 9b, 10b such that the base stations 9, 10 make communication with HRPC 20 in area 9a or 10a, using a predetermined communication system. The base stations 9, 10 are allocated corresponding identification numbers (hereinafter each referred to as a BS number) which identify themselves.

HRPC 20 includes a paging receiver 30 which receives a paging signal from the pager base station 5 or 6 through a pager antenna 30a, demodulates the received paging signal and outputs the resulting paging data, and a transmit-receive circuit 31 which transmits/receives a radio signal to/from the bidirectional radio communication base station 9 or 10 through an antenna 31a and which demodulates the radio signal and modulates data from a control circuit 32, which executes the respective functions and controls data from the elements 30, 31 or data to the transmit-receive circuit 31, and a memory 33 which stores various data. The control circuit 32 includes an input unit 32c which inputs data to the controller 32a, a control unit 32a which receives data from the input unit 32c and processes data processing and controls the whole system, and a display 32b which displays data. HRPC 20 has a paging number allocated in the paging system and a terminal identification number allocated in the bidirectional radio system.

Figure 3A:
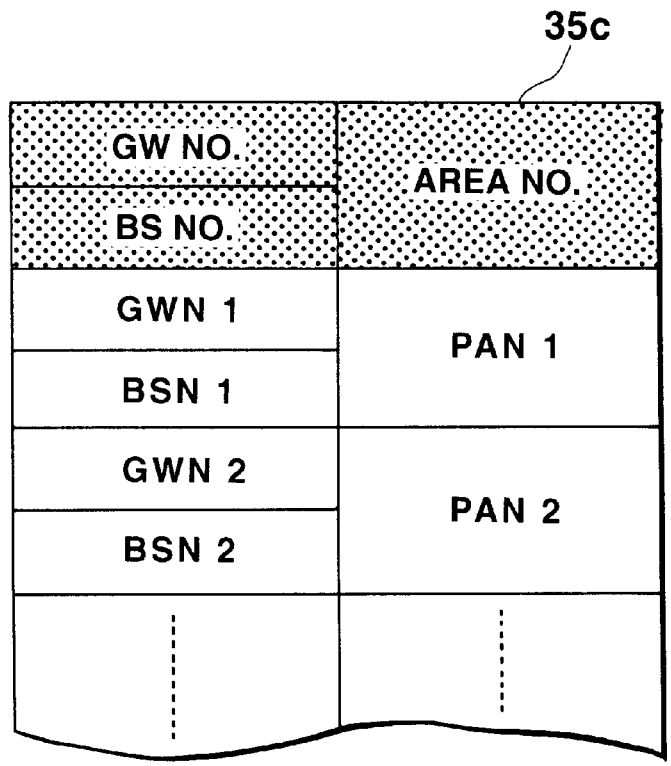
FIGS. 3A and 3B show memory maps of a contrast table in a semi-fixed personal computer.
Figure 3B:
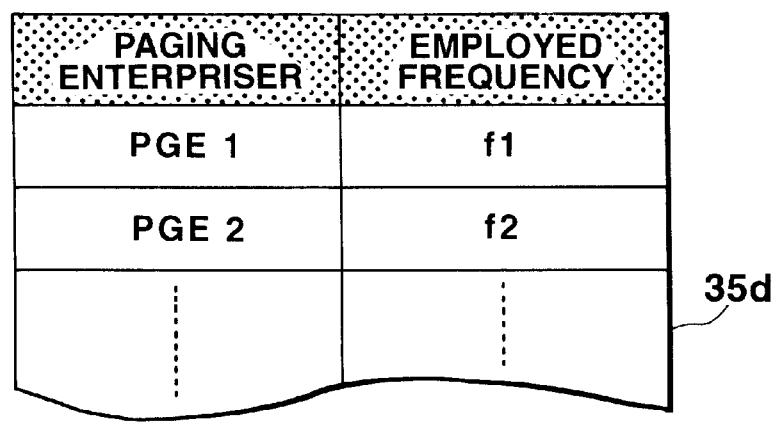

PC 2 includes a GW memory 35a which contains a GW number which identifies a GW connected to a base station whose service area is a place where HRPC 20 exists, and a BS memory 35b which contains a BS number which identifies the base station. The GW and BS memories 35a and 35b contain histories of corresponding newest GW and BS numbers, respectively. PC 2 further includes an area contrast table 35c in which GW and BS numbers (GWN, BSN) and corresponding paging area numbers (PAN) of paging systems are stored, and an employed frequency contrast table 35d in which paging enterprisers and the corresponding frequencies employed by the paging enterprisers are stored. FIG. 3A schematically shows the data structure of the area contrast table 35c in which a paging area number (PAN) of a paging system which covers a service area for a GW and a BS is stored for a GW number (GWN) and a BS number (BSN) which the GW and BS have. Considering the relationship in correspondence between FIG. 3A and FIG. 1, for example, a service area 5a of the paging base station 5 corresponds to base stations 9, 10 of GW 7 (a service area 6a of the paging base station 6 corresponds to the base stations 11, 12 of GW 8). FIG. 3B schematically shows the data structure of the employed frequency contrast table 35d in which receipt frequencies f are stored for the respective paging enterprisers PGE. For the receipt frequency used by the enterpriser, a plurality of different receipt frequencies is preferably stored such that an appropriate frequency is selected depending on the moving range of a HRPC. If a paging service area number is specified in the area contrast table 35c, the corresponding paging enterpriser can be specified. Thus, the receipt frequency used by the paging enterpriser can be specified from the employed frequency contrast table 35d.

While in the above system the two base stations are illustrated as being connected to one GW, the number of base stations connected is not limited to two, but three or more base stations may be connected. The service areas of the base stations do not necessarily cover all the regions continuously, but may cover discrete regions locally like islands.

Throughout the description of this specification, what has been described with respect to BSs 5, 9, 10 and Gw 7 and their associated matters applies to BSs 6, 11, 12 and GW 8 and their associated matters.

B. Bidirectional Communication System

A communication method in a paging system uses a conventional communication method, and a further description thereof will be omitted. A communication method used in the bidirectional radio communication system will be described herein. In the bidirectional radio communication system, there is a wireless communication channel between HRPC 20 and the base station 9 or 10, and a wire communication channel between PC 2 and the base station 9 or 10. The wireless communication channel is realized by the connection between HRPC 20 and the base station 9 or 10 while the wire communication channel is realized by the connection between PC 2 and GW 7 which manages the base station 9 or 10. Thus, data communication is possible between HRPC 20 and PC 2.

B-1. Message Form:

FIGS. 4A to 4D show message forms used in the bidirectional radio communication system. FIGS. 4A and 4B show message forms used in the wireless communication channel. The message basically includes a preamble indicative of both synchronization and a message start, a calling terminal identification sign indicative of a calling terminal, a called terminal identification sign indicative of a called terminal, data to be transmitted and a postamble indicative of an message end.

FIG. 4A shows the form of a message transmitted from a HRPC to a base station and composed of a preamble 311, a HRPC number (like a telephone number) 312 which is a calling terminal identification sign, a PC number (like a telephone number) 313 which is a called terminal identification sign, data 314 and a postamble 315. FIG. 4B shows the form of a message transmitted from a base station to a HRPC and composed of a preamble 321, a calling terminal identification sign (PC number) 322, a called terminal identification sign (HRPC number) 323, BS number 324 which is additional information (indicative of a base station), GW number 325 indicative of a gateway station, data 326 and a postamble 327.

FIGS. 4C and 4D each show the form of a message used in a wire communication channel, and composed basically of a message classification indicative of the classification of a message, called terminal identification sign, connection request, calling terminal identification sign, additional information, data, an end signal indicative of the end of the message.

FIG. 4C shows the form of a message transmitted from a GW to a PC and composed of a call 331 indicative of a message classification, PC number 332 indicative of a called terminal identification sign sent from a base station, network connection request 333 indicative of a request for connection to the network, GW number 334 indicative of a calling terminal identification sign, additional information (BS number 335 of the base station to which a HRPC is connected, and HRPC number 336 received from the base) station, data 337 received from the base station, and an end signal 338.

FIG. 4D shows the form of a message from a PC to a GW, and composed of a call 341 indicative of a message classification, GW number 342 indicative of a called terminal identification sign, GW connection request 343 indicative of a request for connection, PC number 344 indicative of a calling terminal identification sign, additional information (BS number 345, HRPC number 346), data to be transmitted 347, and end signal 348.

The messages from a PC can additionally include information associated with paging as requested.

B-2. Signal Flow

The flow of a message between HRPC 20 and PC 2 through base station 9 and GW 7 will now be illustrated as an example.

FIG. 5A shows the flow of a message from HRPC 20 to PC 2. HRPC 20 creates a message A of FIG. 4A from the HRPC number of HRPC 20 as a calling terminal identification sign, the PC number of PC 2 as a called terminal identification sign, and data to be transmitted. The message A is transmitted by radio to the base station 9, which receives the message A and transfers received HRPC number, PC number and data to GW 7. GW 7 creates a message B on the basis of the PC number as the called terminal identification sign, the GW number of GW 7 as the calling terminal identification sign, connection request, additional information (the BS number of the base station from which the message was received, the HRPC number received from the base station 9) and data received from the base station 9.

This message B is sent to the network 1, which sends the message B to PC 2 having a PC number indicative of a called terminal identification sign. That is, data is sent from HRPC 20 to PC 2. At this time, PC 2 stores the GW and BS numbers of the received message B in GW memory 35a and BS memory 35b, respectively.

FIG. 5B shows the flow of a message from PC 2 to HRPC 20. PC 2 creates a message C of FIG. 4C from the PC number of PC 2 as a calling terminal identification sign, the HRPC number as a called terminal identification sign, and data to be transmitted, connection request, GW number stored in GW memory 35a and the BS number stored in the BS memory 35b. This message C is sent to the network 1, which sends the message C to GW 7 having the GW number as the called identification sign. GW 7 creates a message D on the basis of the HRPC number of signal C as a called terminal identification sign, the PC number of PC 2 as a calling terminal identification sign, additional information (the received BS number of the base station and the GW number of GW 7) and the received data. GW 7 sends the message D through the base station having the BS number (here, base station 9) by radio to HRPC 20. That is, data is sent from PC 2 to HRPC 20.

As described above, the signal sent between PC 2 and HRPC 20 includes the identification signs indicative of the calling and called terminals and a relay point identification sign indicative of a relay point through which the message is sent to the called terminal. Thus, without adding any special compositions to the network 1, the HRPC 20 and PC 2 can be connected to the network very easily.

With this bidirectional radio communication system, the radio communication systems (partial radio communication systems represented by GWs 7, 8) to which HRPCs 20, 21 can be connected do not necessarily have the same technical characteristics. The necessary conditions of the radio communication systems are that data can be delivered between HRPC 20 (21) and PC 2 (3), those terminals can be connected to the network 1, and those terminals can send/receive appropriate ones of HRPC, PC, BS and GW numbers as control information. As an example of this system, for example, GW 7 may be a wide region radio communication system which supports field service terminals in a public area, GW 8 may be a narrow region radio communication system (like a small area radio LAN) which supports field service terminals in an indoor area (for example, an intra-company or intra-campus).

In this case, if GWs 7, 8 of FIG. 1 are connectable through the network 1 to PCs 3, 2, they can send/receive a message through PCs 3, 2 between HRPCs 20 and 21 (which will be described later). The protocols of GWs 7, 8 of the respective radio communication systems are convertible to each other, a message can be sent/received between HRPCs 20 and 21 present in the respective service areas.

B-3. Movement of a Terminal:

In the bidirectional radio communication system, for example, when HRPC 20 has moved to a different service area, PC 2 does not know where HRPC 20 is. Thus, there is a probability that communication channel can not be connected between PC 2 and HRPC 20. In order to avoid this problem, the HRPC is away from the service area of the current base station, periodically connects with the bidirectional radio communication base station, and calls the corresponding PC to thereby update the GW and BS numbers in the GW and BS memories 35a and 35b, respectively.

Assume, for example, that HRPC 20 has moved from the service area of the GW number (for example, GW 7) and BS number (for example, BS 9) stored in the GW and BS memories 35a, 35b, respectively, to the service area of the GW 7 and BS 10. HRPC 20 connects periodically with a connectable base station (here, BS 10) to send a signal with no data to PC 2, as described above. Thus, the GW (here, GW 7) adds a new GW number (GW 7) and a new BS number (BS 10) to the signal and sends the resulting signal to PC 2, which receives this signal and stores the new GW number (GW 7) and new BS number (BS 10) in the GW and BS memories 35a and 35b, respectively.

That is, the GW and BS numbers stored in PC 2 are periodically updated.

Thus, even when HRPC 20 has moved from the service area of the base station 9 to the service area of the base station 10, the data in the GW and BS memories 35a and 35b of PC 2 are updated with the newest data (GW 7, Gw 10). Thus, data can be sent from PC 2 to HRPC 20.

C. Communication Process

Case 1:

A PC calls a HRPC, using a paging system, and sends data, using a bidirectional radio communication system to HRPC. Assume data transmission between PC 2 and HRPC 20 and also assume that the paging service area 5a and the bidirectional radio communication service area 9a area used.

Figure 6:
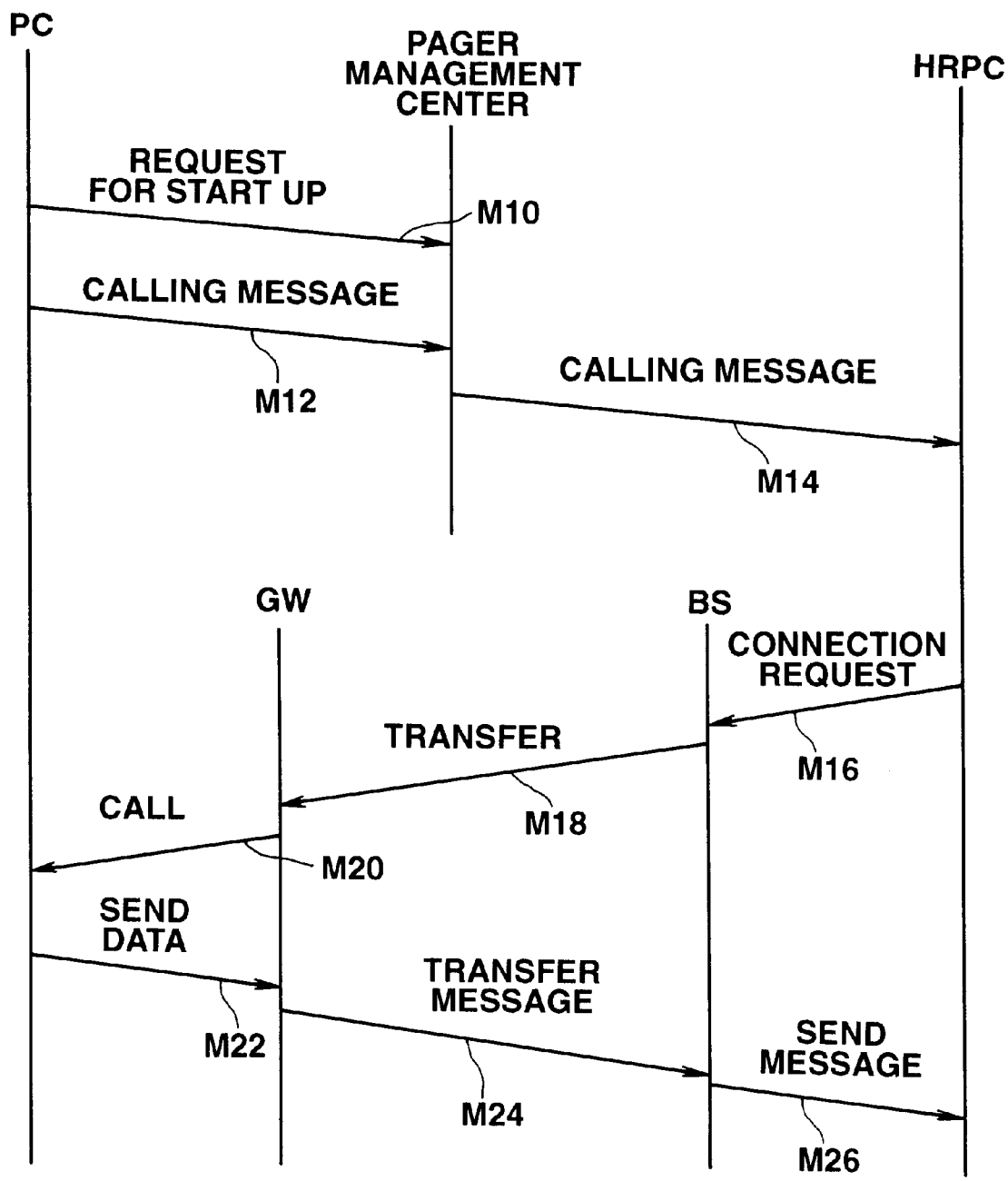
FIG. 6 shows a signal flow in a case 1 in the present invention.

In FIG. 6, when external PC 3 or server 4 inputs data (for example, a mail or the result of retrieval) to PC 2, the pager management center 13 is dialed automatically to call HRPC 20, using the paging service. Thus, PC 2 sends a startup request to the pager management center 13 (M10). In response to this request, the pager management center 13 is placed in a message wait state in which the center 13 waits for a message to be sent to a terminal to be called. PC 2 then sends as a message a request for starting up the unidirectional radio communication system to the pager management center 13 (M12). Receiving this message, the pager management center 13 sends the message through the pager base station 5 to HRPC 20 (M14). In HRPC 20, the paging receiver 30 receives and demodulates this message and outputs the resulting message to the control circuit 32, which causes the transmit-receive circuit 31 to operate on the basis of this message to send a request for connection with PC 2 shown by the message A of FIG. 4A to a presently connectable bidirectional radio communication base station 9 (M16). Receiving this request, BS 9 transfers the request for connection to host GW 7 (M 18). GW 7 adds its GW number and a BS number to the received request for connection to create a calling message shown by the message C of FIG. 4C and sends the created message to the network 1. The network control center 14 recognizes this calling message and sends this message to a PC 2 having a PC number which is a called terminal identification sign (M 20). Receiving this message, PC 2 stores the GW and BS numbers into the GW and BS memories 35a and 35b, respectively, and creates a calling message for HRPC 20 shown by the message D of FIG. 4D on the basis of the received data, and sends it to the network 1. The network 1 which receives this message and sends same to GW 7 having GW number which is a called terminal identification sign (M 22). Receiving this message, GW 7 sends the message to BS 9 having BS number which is additional information (M 24). Receiving this message, BS 9 creates the message shown by a signal B of FIG. 4B and sends this message to HRPC 20 having the received HRPC number (M 26). HRPC 20 receives and demodulates this data in the transmit-receive circuit 31 and takes the resulting data and outputs same to the control unit 32a, which then displays this data on the display 32b.

Case 2:

Data is sent, using the bidirectional radio communication system. Assume that data is transmitted between PC 2 and HRPC 20, and that the bidirectional radio communication service area 9a is used.

Figure 7:
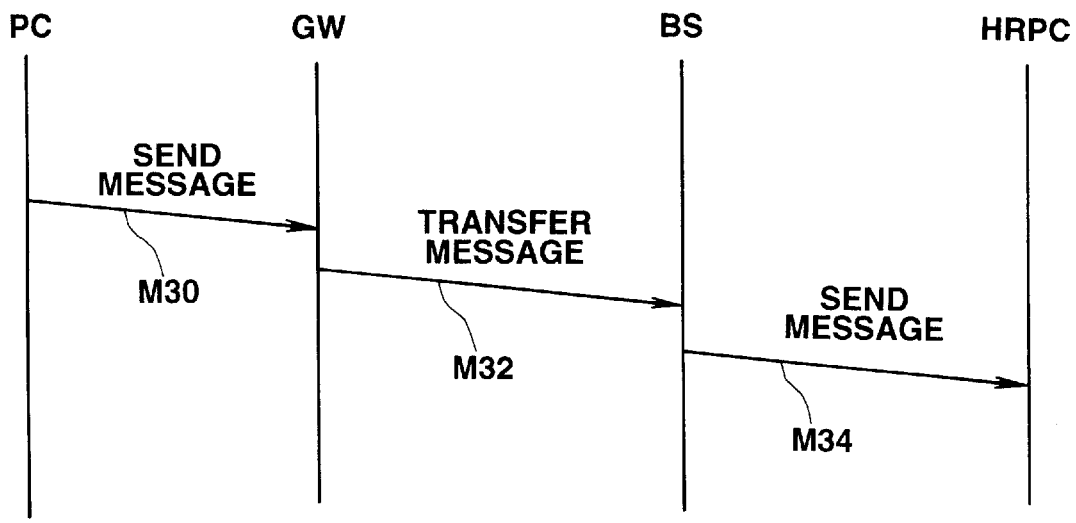
FIG. 7 shows a signal flow in a case 2 in the present invention.

In FIG. 7, data (for example, mail, the result of retrieval) is input from external PC 3 or server 4 to PC 2. In response, PC 2 creates a calling message for HRPC 20 shown by the message D of FIG. 4D on the received data and the basis of the GW and BS numbers stored in the GW and BS memories 35a and 35b, respectively, and sends the calling message to the network 1, which receives and recognizes this calling message and sends the message to GW 7 having a GW number which is a called terminal identification sign (M30). Receiving this message, GW 7 sends the message to BS 9 having a BS number which is additional information (M32).

Receiving this message, BS 9 creates a message shown by the message B of FIG. 4B and sends same to HRPC 20 having the received HRPC number (M34). HRPC 20 receives and demodulates this message in the transmit-receive circuit 31, and takes and sends the resulting data to the control unit 32a, which then displays this data on display 32b.

Case 3:

A HRPC calls a PC, using a bidirectional radio communication system and sends data to the HRPC, using a bidirectional radio communication system. In this case, assume data transmission between PC 2 and HRPC 20, and the use of the paging service area 5a and the bidirectional radio communication service area 9a.

Figure 8:
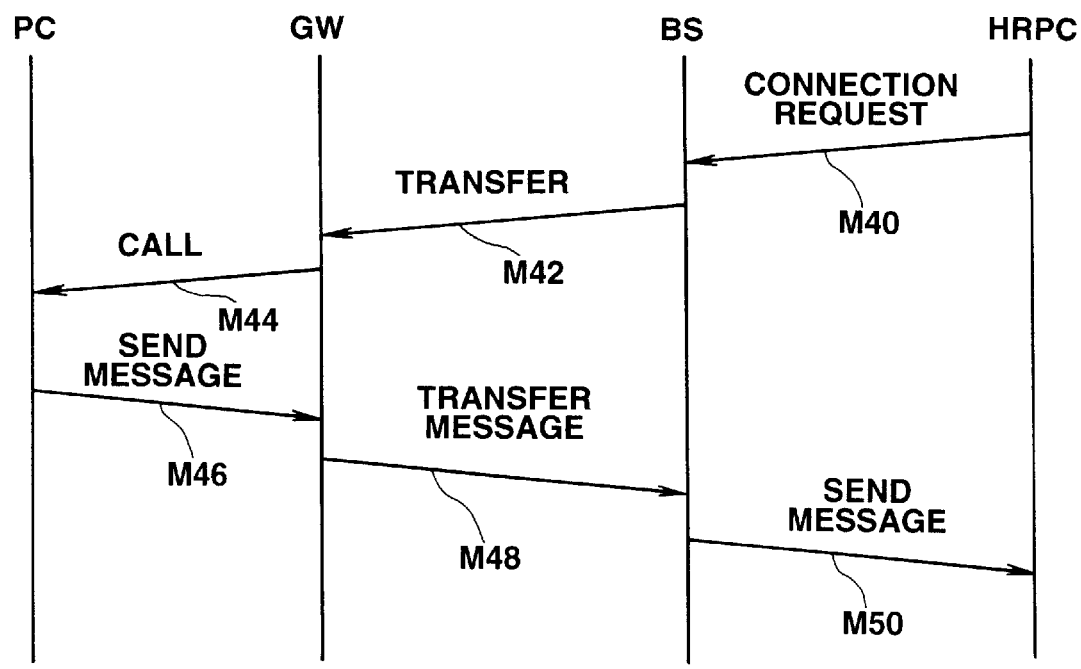
FIG. 8 shows a signal flow in a case 3 in the present invention.

In FIG. 8, data (for example, a mail, the result of retrieval) is input from an external PC 3 or server 4 to PC 2. When there is a request for data from the input unit 32c of HRPC 20 by the user's manipulation, the control circuit 32 operates the transmit-receive circuit 31 sends a request for connection with PC 2 shown by the message A of FIG. 4A to a presently connectable bidirectional radio communication base station 9 (M40). Receiving this request, BS 9 transfers the request for connection to the host GW 7 (M42). GW 7 adds its GW number and a BS number to the request for connection to create a calling message shown by the message C of FIG. 4C and sends that message to the network 1. The network control center 14 recognizes this calling message and sends this message to a PC 2 having a PC number which is a called terminal identification sign (M 44). Receiving this message, PC 2 stores the GW and BS numbers into the GW and BS memories 35a and 35b, respectively, and creates a calling message for HRPC 20 shown by the message D of FIG. 4D on the basis of the received data, and sends the created message to the network 1. The network 1 recognizes this message and sends this message to GW 7 having a GW number which is a called terminal identification sign (M 46). Receiving this message, GW 7 sends the message to BS 9 having a BS number which is additional information (M 48). Receiving this message, BS 9 creates a message shown by the message B of FIG. 4B and sends the message to HRPC 20 having the received HRPC number (M 50). HRPC 20 receives and demodulates this message in the transmit-receive circuit 31 and takes the resulting data and outputs same to the control unit 32a, which then displays this data on the display 32b.

Case 4:

It is not clear whether there is necessarily a HRPC in the service area of a bidirectional radio communication system when a PC sends data to the HRPC. Thus, there is the case in which even when the PC sends the data to the HRPC, using the bidirectional radio communication system, there can be no HRPC in the service area and the data can not be sent to the HRPC. When the PC receives a message that the data can not be sent, the PC again sends data to a position where the presence of a HRPC is presumed. When connection to the HRPC, using the bidirectional radio communication system, is impossible, the PC sends the data to the HRPC to the effect that the PC desires to send the data to the HRPC, using the paging system.

Figure 9:
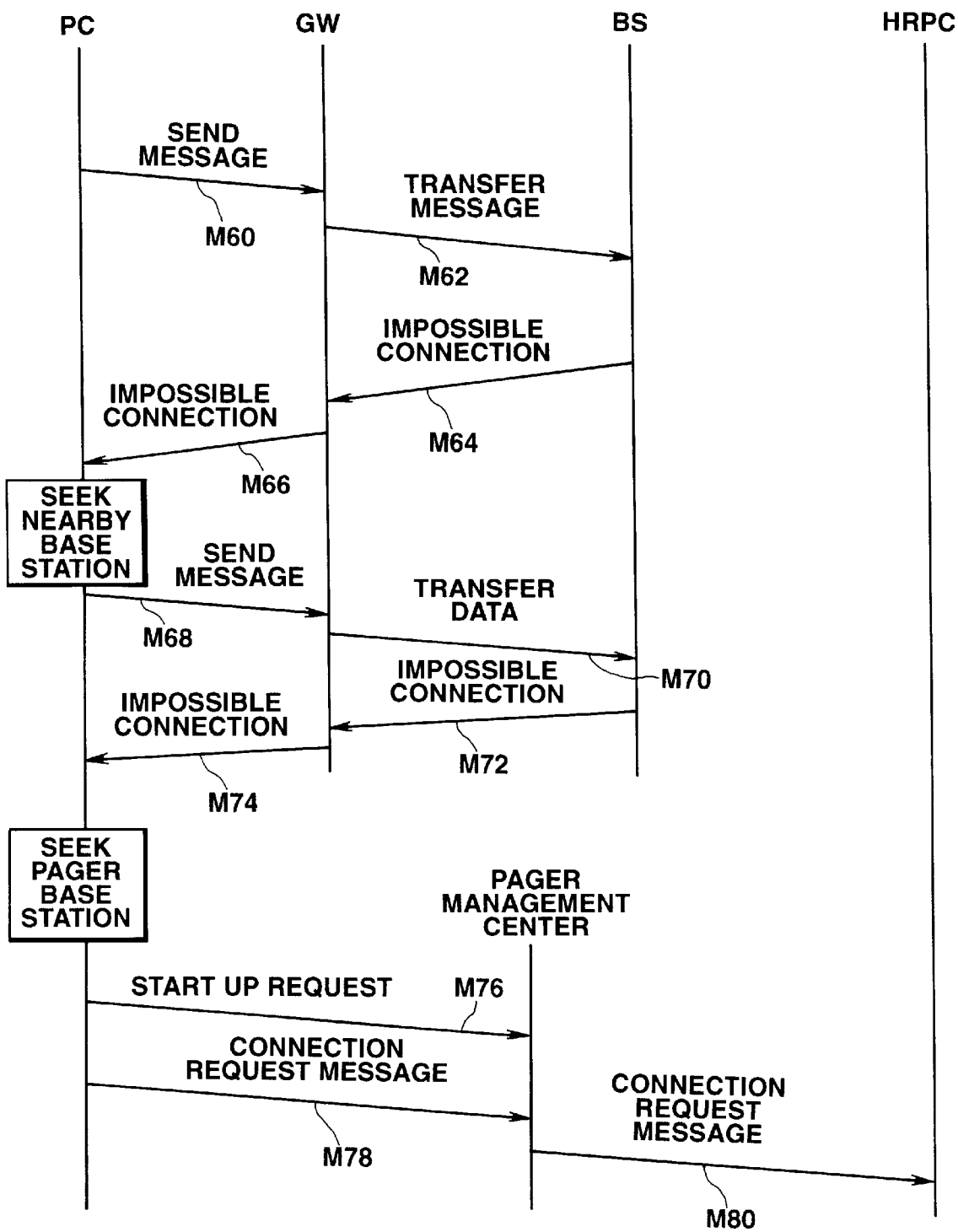
FIG. 9 shows a signal flow in a case 4 in the present invention.

In FIG. 9, when PC 2 receives data externally, it creates a message D of FIG. 4D on the basis of the GW and BS numbers stored in the GW and BS memories 35a, 35b, respectively. In order to send data to the HRPC, using the bidirectional radio communication system, the PC 2 sends the message D to the network 1. The network control center 14 of the network 1 receives the message D and sends it to GW 7 having a called GW number of the message D (M60). Receiving this message, GW 7 transfers this message D to BS 9 having a BS number which is additional information of the message D (M62). Receiving this data, BS 9 creates a message B of FIG. 4B and sends it to HRPC 20. At this time, if there is a response from HRPC 20, BS 9 sends PC 2 a completion signal indicating that the data transmission has been completed as usual. However, if there is no response signal received even when the data is sent because there is no HRPC 20 is present in the service area, BS 9 reports to PC 2 through GW 7 and the network 1 that connection is impossible (M64, M66). Receiving this report, PC 2 seeks an adjacent set of GW and BS (for example, GW 7, BS 10) on the basis of the GW and BS numbers stored in the GW and BS memories 35a and 35b and again creates a message D on the basis of the GW and BS numbers of the sought GW and BS, and again sends the message to the network 1 (M68). The message is then transferred to BS 10 in a manner similar to that mentioned above (M70) and then sent also to HRPC 20. If there is a response, BS 7 sends a completion signal indicative of the completion of data transmission. If there is no response, BS 10 sends a message indicative of impossible connection to PC 2 (M72, M74).

Receiving this message indicative of the impossible connection, PC 2 seeks a paging service area of a paging system corresponding to the GW and BS numbers stored in the GW and BS memories 35a and 35b, respectively by referring to the area contrast table 35c. PC 2 requests the pager management center 13 to start up, using information on the sought paging service area as additional information (M76). Subsequently, PC 2 sends HRPC 20 a message indicative of a request for connection to HRPC 20 (M78). The pager management center 13 sends HRPC 20 the message on the basis of the startup request and the paging service area information received after the startup request (M80). Thus, HRPC 20 can recognize that PC 2 desires to send data to HRPC 20.

Case 5:

When HRPC has contracted with a plurality of paging enterprisers, the receipt frequency used varies depending on which enterprise's paging signal the HRPC receives. The HRPC does not know which receipt frequency is preferable for the purpose of receipt. In such a case, it is necessary for the HRPC to set the receipt frequency. To this end, each time the GW and BS numbers of the PC are updated, the HRPC seeks the corresponding communication enterprises. The receipt frequency corresponding to the sought communication enterpriser is sent to the HRPC. Thus, the enterpriser and receipt frequency optimal to an area where the HRPC exists are automatically selected and set, respectively.

The relationship between the communication enterpriser and the frequency to be selected is as shown in the employed frequency contrast table 35d of FIG. 3B; for example, employed frequency f1 for paging enterpriser PGE 1, and employed frequency f2 for paging enterpriser PGE 2.

Figure 10:
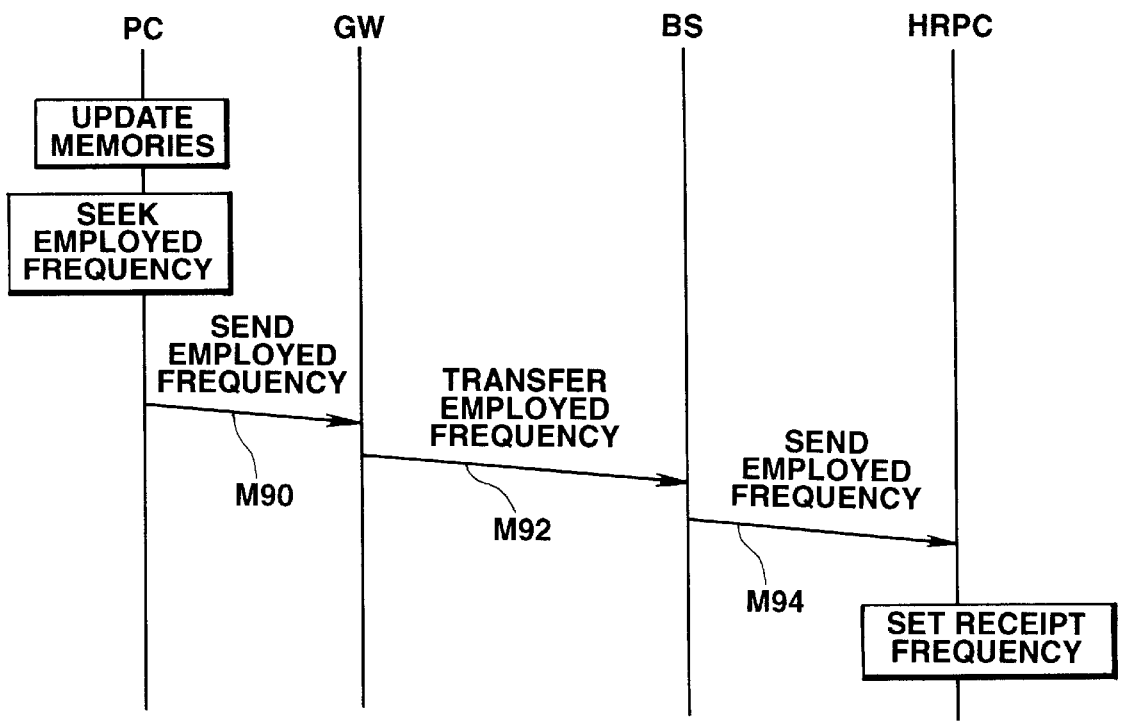
FIG. 10 shows a signal flow in a case 5 in the present invention.

In FIG. 10, the GW and BS memories 35a and 35b of PC 2 are updated by a message from HRPC 20. In response to this updating, PC 2 seeks a paging service area corresponding to the updated GW and BS numbers on the basis of the area contrast table 35c of FIG. 3A. PC 2 specifies a paging enterpriser to be used on the basis of the searched paging service area and seeks an employed frequency allocated to the paging enterpriser by referring to the employed frequency contrast table 35d of FIG. 3B. PC 2 creates a message D for HRPC 2, using the sought frequency as data, and sends the message D to the network 1. The network control center 14 of the network 1 transfers this message D to GW 7 having a called GW number (M90). GW 7 transfers this message D to BS 9 (M92). BS 9 sends the created message B to the HRPC 20 (M94). HRPC 20 receives this message B and stores the employed frequency in the memory 33 and sets it in the receipt frequency generator 37.

In this embodiment, PC sets the employed frequency automatically. The HRPC is also capable of also setting the employed frequency automatically. To this end, the HRPC has the area contrast table and employed frequency contrast table of FIGS. 3A and 3B, respectively. The HRPC recognizes a presently connectable BS and seeks a paging service area corresponding to the BS by referring to the area contrast table of FIG. 3A, specifies a paging enterpriser on the basis of the paging service area, and seeks an employed frequency by referring to the employed frequency contrast table of FIG. 3B, and sets the sought employed frequency in the receipt frequency generator 37.

Case 6:

A particular HRPC sends data to a different HRPC.

In this case, the particular HRPC does not know where the different HRPC is. Thus, the particular HRPC requests a PC which corresponds to the different HRPC and which stores the position of the different HRPC to send information on the position of the different HRPC to the particular HRPC, and calls the different HRPC on the basis of the information. If the particular HRPC is compatible with the different HRPC, the former can send data directly to the different HRPC. However, if not, the particular HRPC temporarily sends data to the PC corresponding to the different HRPC, and then causes the PC to send the data to the different HRPC.

Figure 11:
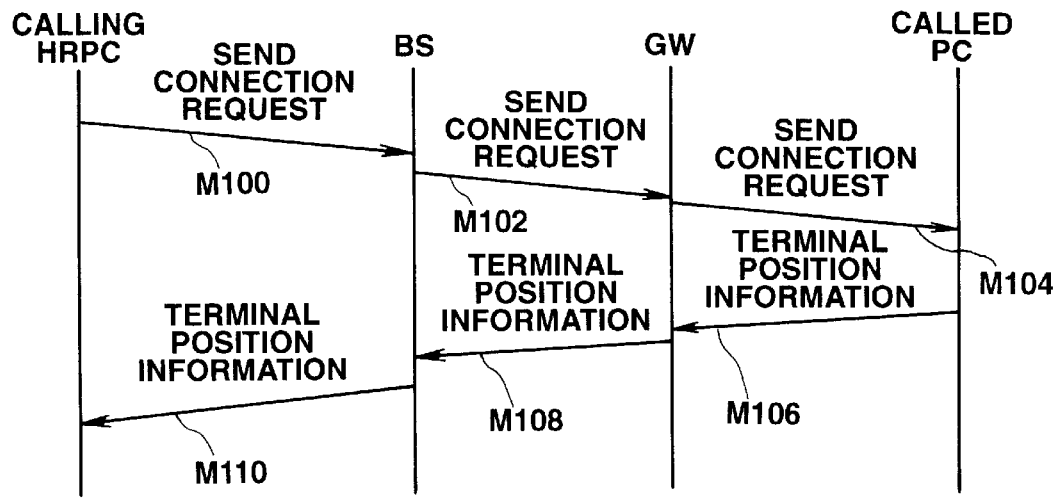
FIG. 11 shows a signal flow in a part of a case 6 in the present invention.

Assume now that HRPC 20 sends data to HRPC 21. In FIG. 11, HRPC 20 sends a request for connection to a called HRPC 21 to PC 3 which is the host of the called HRPC 21 (M100, M102, M104). At this time, simultaneously, HRPC 20 sends data on the respective communication capabilities of GW 7 and BS 9. PC 3 receives this data, and determines whether GW 8 and BS 11 corresponding to the HRPC 21 are compatible in communication capability with the communication capacities of GW 7 and BS 9 of HRPC 20, the data on which was received, (for example, completely compatible, exchangeable (the communication process is changeable), or non-compatible). PC 3 then writes the GW and BS numbers stored in the GW and BS memories 35a and 35b, information on the position of HRPC 21, and a signal indicative of the result of determination as to the compatibility into a data portion of the message D, and sends it to calling HRPC 20 (M106, M108, M110).

Figure 12:
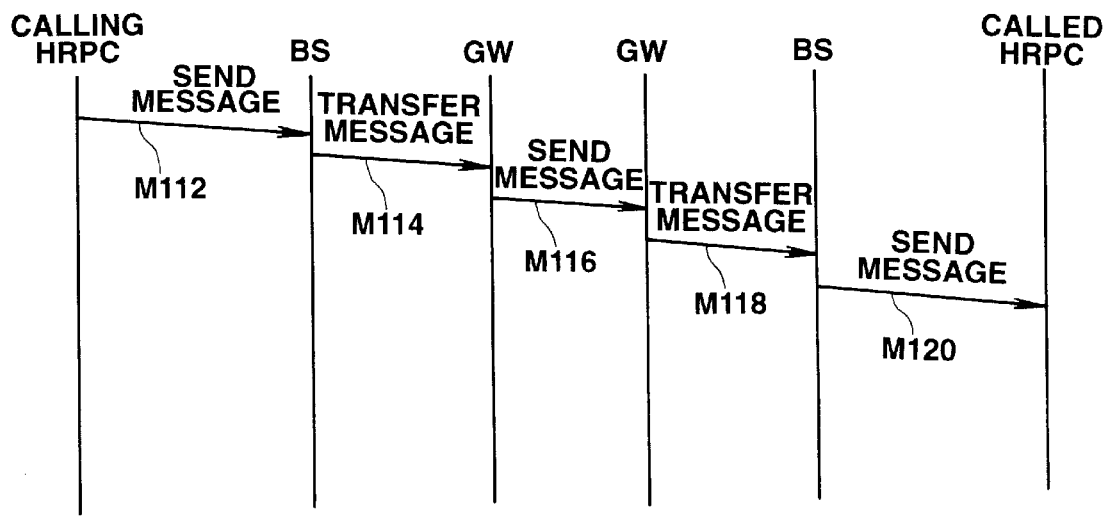
FIG. 12 shows a signal flow in another part of the case 6 in the present invention.

When the calling HRPC 20 receives from PC 3 the signal that there is compatibility in communication capability (completely compatible or exchangeable), the calling HRPC 20 sends data directly to the HRPC 21, as shown in FIG. 12. Basically, this data transmission is the same as data transmission to the PC, mentioned above. That is, HRPC 20 creates a transmission message including the GW number of GW 8 which is information on the position of HRPC 21 as called terminal identification sign, and the HRPC number of HRPC 21 and the BS number of BS 11 as information on the called side, and sends that transmission message to BS 9 (M112). BS 9 transfers this message to GW 7 (M114). GW7 creates on the basis of the transferred message a calling message which includes the GW number of GW8 as a called terminal identification sign, a request for connection to a gateway, the GW number of GW 7 as a calling terminal identification sign, calling terminal additional information (the BS number of BS 9, the HRPC number of HRPC 20), called terminal additional information (the BS number of BS 11, the HRPC number of HRPC 21), and data. By sending this calling message to the network 1, the network control center 14 recognizes the request for connection and the called terminal identification sign and sends the calling message to GW 8 (M116).

When GW 8 receives the calling message, it transfers the received message to BS 11 on the basis of the BS number of BS 11 received as the called side additional information (M118). BS 11 sends data to HRPC 21 on the basis of the HRPC number of HRPC 21 as the transferred called side additional information (M120) to thereby complete the data transmission.

Figure 13:
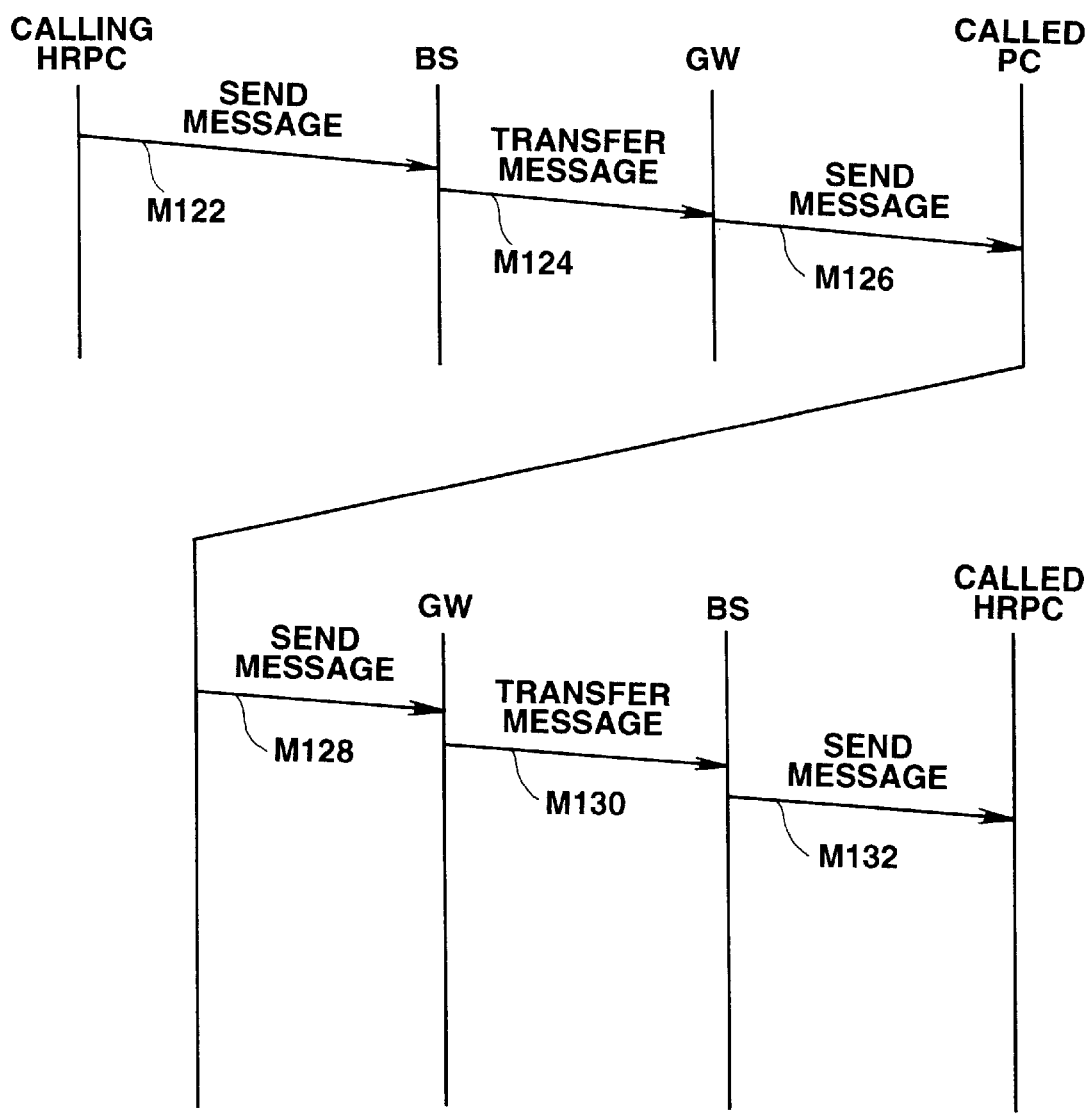
FIG. 13 shows a signal flow in a further part of the case 6 in the present invention.

When GW 8 is informed that there is no compatibility in communication capability, it sends the data to the called side PC and causes same to transfer the message to GW 8, as shown in FIG. 13. HRPC 20 creates a transmission message which includes the HRPC number of HRPC 20 as a calling terminal identification sign, the PC number of PC 3 as a called terminal identification sign, the PC number of the calling PC 2 as additional information, and a message, and sends this transmission message to BS 9 (M122). Receiving this message, BS 9 transfers this message to GW 7 (M124). GW 7 creates on the basis of the received transferred message a calling message which includes the PC number of PC 3 as the called terminal identification sign, data on a network to be connected, the GW number of GW 7 as the calling terminal identification sign, the BS number of BS 9 as the calling side additional information, the HRPC number of HRPC 20, the PC number of PC 2 and the data. GW 7 then sends this calling message to the network 1 (M126). The network control center 14 recognizes the called terminal on the basis of the connection request and called terminal identification sign contained in this calling message and sends the message to PC 3 having the PC number.

Thus, in response to this message, PC 3 creates calling data for HRPC 21 on the basis of the GW and BS numbers stored in the GW and BS memories 35a and 35b, respectively, of PC 3 as in the case 2. PC 3 then sends this calling message to GW 8 having the GW number (M128). GW8 transfers the message to BS 11 having the BS number in the received message (M130). BS 11 sends this transferred message to HRPC 21 (M132). Thus, the data transmission from HRPC 20 to HRPC 21 is completed indirectly.

In the above embodiment, the data was sent, using only the bidirectional radio communication system. However, the called HRPC 21 cannot always be connected to the calling HRPC through the bidirectional radio communication system, as in the case 4. In this case, the connection request may be informed through the paging system as in the case 4.

As described above, in the case 6, information on the positions of the individual HRPCs is managed by the corresponding host PC. By using this fact, data can be sent to a different HRPC so that the bidirectional radio communication system itself is not required to have a system which manages the position of a HRPC as a mobile terminal.

According to the present invention, when data (such as an electronic mail) is input to a sendable/receivable semi-fixed terminal connected to the network in a semi-fixed manner, the semi-fixed terminal is capable of sending the data at once to a desired mobile terminal.

A system is easily constituted by allocating inherent identification numbers to the respective base stations and gateway stations which constitute the bidirectional radio data communication system, and by managing the identification numbers, using the semi-fixed terminal.

Since a mobile terminal periodically updates information on the positions of the HRPCs managed by the semi-fixed terminal, this system is also applicable to the movement of the mobile terminal to thereby ensure the transmission of data.

When communication based on the bidirectional radio data communication system is impossible, leakage of data transmission to a mobile terminal is reduced by reporting the receipt of the data from the unidirectional radio data communication system to the semi-fixed terminal.

By placing beforehand the positions of the mobile terminals and the positions of the areas of the unidirectional radio data transmission systems, the traffic of the unidirectional radio data transmission is reduced.

By placing beforehand the positions of mobile terminals and the receipt frequencies of the unidirectional radio data communication system in corresponding relationship, the receiving probability of the unidirectional radio data transmission system is increased.

When data is sent from any particular mobile terminal to a different mobile terminal, the data can be sent easily to the different mobile terminal by accessing the semi-fixed terminal which manages the mobile terminals.

What is claimed is:

1. A radio communication system for use with an existing network, comprising:

a personal computer coupled in a semi-fixed manner to the existing network;

a unidirectional transmitting system including a unidirectional base station coupled to the existing network, for sending data to a terminal according to a request;

a bidirectional transmitting system having a plurality of transmitters/receivers coupled to the existing network, for sending/receiving the request from the existing network for data from a terminal; and a terminal having a first identification number allocated in said unidirectional transmitting system and a second identification number allocated in said bidirectional transmitting system, for receiving data from said unidirectional transmitting system and for receiving/sending the data from/to said bidirectional transmitting system;

wherein when external data is input, said personal computer sends a request to said unidirectional transmitting system in order to inform said terminal of a presence of the external data to be received;

wherein said unidirectional transmitting system sends a message informing of the presence of said external data to said terminal by use of said first identification number, based on the request from said personal computer;

wherein said terminal, responsive to said message from said unidirectional transmitting system, sends said bidirectional transmitting system a request to respond to said message by use of said second identification number;

wherein said bidirectional transmitting system, responsive to the request from said terminal, sends said personal computer a received response message and identification information of the transmitter/receiver connected to the terminal;

wherein the personal computer, responsive to the response message and the identification information, sends to the bidirectional transmitting system the external data with the identification information of the transmitter/receiver; and wherein the bidirectional transmitting system receives the external data with the identification information from the personal computer, and sends the external data to the terminal via the transmitter/receiver.

2. A radio communication system according to claim 1, wherein the personal computer stores the position information pertaining to the position of the transmitter/receiver.

3. A radio communication system according to claim 2, wherein the personal computer sends the network the data signal with the stored position information pertaining to the position of the transmitter/receiver attached to the data signal.

4. A radio communication system according to claim 2, wherein a calling of the terminal from the personal computer is performed through the network and the transmitter/receiver of the bidirectional transmitting system on the basis of the stored position information pertaining to the position of the transmitter/receiver.

5. A radio communication system according to claim 1, wherein:
the transmitter/receiver comprises:
a gateway station connected to the existing network; and
a base station connected to the gateway station for communicating with the terminal through a wireless communication channel; and
wherein the position information pertaining to the position of the transmitter/receiver comprises a sign for identifying the gateway station and a sign for identifying the base station.

6. A radio communication system according to claim 1, wherein:
the personal computer contains area information pertaining to an area of the unidirectional transmitting system corresponding to the position information pertaining to the position of the transmitter/receiver;
wherein the personal computer sends the unidirectional transmitting system area information corresponding to the position information when the personal computer calls the terminal, using the unidirectional communication system; and
wherein the unidirectional transmitting system calls the area involved in the sent area information.

7. A radio communication system according to claim 1, wherein:
the unidirectional transmitting system includes a plurality of unidirectional transmitting systems;
the personal computer includes means for outputting a plurality of different frequency signals, one for each of the plurality of unidirectional transmitting systems in correspondence to the position information pertaining to the position of the transmitter/receiver, and sends an outputted frequency signal through the network and the transmitter/receiver to the terminal on the basis of the position information pertaining to the position of the transmitter/receiver; and
the terminal receives a signal from a predetermined unidirectional transmitting system on the basis of the outputted frequency signal.

8. A radio communication system according to claim 2, wherein the position information pertaining to the position of the relay stored in the personal computer is updated periodically by the terminal.

9. A radio communication system according to claim 1, wherein when the personal computer fails in sending the data to the terminal on the basis of the position information, the personal computer seeks another transmitter/receiver in the vicinity of the first-mentioned transmitter/receiver, and adds position information pertaining to the position of said another transmitter/receiver to the data and sends the resulting data to the existing network again.

10. A radio communication system according to claim 1, wherein:
when the terminal sends data to a different terminal, the former terminal requests a personal computer corresponding to the different terminal to send the data;
the personal computer corresponding to the different terminal receives this request and sends the information on the position of the different terminal to the former terminal; and
the former terminal sends the network the data with position information pertaining to the position of the different terminal received from the personal computer corresponding to the different terminal.

11. A personal computer in a radio communication system in which the personal computer is connected in a semi-fixed manner to an existing network, and a terminal is connected to the network, to provide communication between the personal computer and the terminal, wherein the personal computer comprises:
positional information storage means for storing position information pertaining to a position of the terminal; and
sending means for sending to the terminal, externally input data on the basis of the position information stored in the positional information storage means;
wherein the radio communication system further comprises:
a unidirectional transmitting system for enabling the personal computer to call the terminal; and
a bidirectional transmitting system for enabling bidirectional communication between the personal computer and the terminal via a transmitter/receiver; and
wherein the personal computer includes means for calling the terminal through the unidirectional transmitting system, the terminal having a first-identification number allocated in said unidirectional transmitting system and a second identification number allocated in said bidirectional system, and
wherein the terminal sends signals to the personal computer only via the transmitter/receiver of the bidirectional transmitting system and said network, and
wherein the personal commuter updates the position information stored in the Positional information storage means.

12. A personal computer according to claim 11, wherein the position information pertaining to the position of the terminal comprises a sign for identifying a transmitter/receiver.

13. A personal computer according to claim 11, further comprising:

detection means for detecting that data has been input externally to the personal computer;

calling means for sending a calling signal to the terminal via the unidirectional transmitting system in response to the detection means detecting that data has been input externally; and wherein the sending means sends data to the terminal in response to the terminal responding to the calling signal sent by the calling means.

14. A personal computer according to claim 13, wherein:

the calling means sends the calling signal to the radio terminal, using said unidirectional communication system, in response to the detection means detecting that data was input externally.

15. A personal computer according to claim 11, wherein said identification information storage means comprises identification information updating means for storing identification information added at a transmitter/receiver to a signal received from the identification terminal.

16. A terminal of a radio communication system in which a personal computer is connected in a semi-fixed manner to an existing network, the terminal being connected through a transmitter/receiver of a bidirectional transmitting system to the network, the bidirectional transmitting system provides communication between the personal computer and the terminal, and a unidirectional transmitting system is provided for sending a message to the terminal from the personal computer, the terminal having a first identification number allocated in said unidirectional transmitting system and a second identification number allocated in said bidirectional system, the terminal comprising:

receiving means for receiving a signal from the transmitter/receiver;

sending means for sending a signal to the transmitter/receiver;

wherein when the receiving means receives a calling signal sent through the transmitter/receiver from the personal computer, the sending means sends a response signal corresponding to the calling signal through the transmitter/receiver to the personal computer, and the receiving means receives data sent from the personal computer in response to the response signal; and message receiving means for receiving a message through the unidirectional transmitting system; and wherein when the message receiving means receives a calling signal from the personal computer via the unidirectional transmitting system, the sending means sends the personal computer a response signal corresponding to the calling signal through the transmitter/receiver, and the receiving means receives data sent from the personal computer, via the bidirectional transmitting system in response to the response signal.

17. A radio terminal according to claim 16, wherein said sending means of the terminal sends a predetermined signal to the personal computer periodically.

\* \* \* \* \*